United States Patent
Sakamoto et al.

(10) Patent No.: US 7,170,718 B2
(45) Date of Patent: Jan. 30, 2007

(54) WIRING BODY WITH FLEXURE SHEET CONNECTING THE HEAD SLIDER AND THE DRIVING UNIT IN A DISK APPARATUS

(75) Inventors: Kenichi Sakamoto, Osaka (JP); Makoto Miyamoto, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 451 days.

(21) Appl. No.: 10/323,857

(22) Filed: Dec. 18, 2002

(65) Prior Publication Data
US 2003/0142447 A1    Jul. 31, 2003

(30) Foreign Application Priority Data
Dec. 18, 2001  (JP) .............. 2001-384318

(51) Int. Cl.
*G11B 5/55*    (2006.01)
(52) U.S. Cl. .................................... 360/264.2
(58) Field of Classification Search .............. None
See application file for complete search history.

(56) References Cited

U.S. PATENT DOCUMENTS

| | | | |
|---|---|---|---|
| 5,615,068 A | | 3/1997 | Matsuda et al. |
| 5,754,368 A | | 5/1998 | Shiraishi et al. |
| 5,883,758 A | * | 3/1999 | Bennin et al. ............ 360/245.9 |
| 5,898,541 A | * | 4/1999 | Boutaghou et al. ....... 360/294.4 |
| 5,924,187 A | * | 7/1999 | Matz ...................... 29/603.03 |
| 5,982,584 A | * | 11/1999 | Bennin et al. ............ 360/245.9 |
| 5,999,375 A | * | 12/1999 | Forbord et al. ........... 360/265.1 |
| 6,008,966 A | * | 12/1999 | Forbord et al. ........... 360/97.03 |
| 6,025,988 A | * | 2/2000 | Yan ........................... 361/685 |
| 6,163,443 A | | 12/2000 | Hatagami et al. ........... 360/323 |
| 6,236,533 B1 | * | 5/2001 | Forbord et al. ........... 360/98.01 |
| 6,246,552 B1 | * | 6/2001 | Soeno et al. ............. 360/294.4 |
| 6,704,165 B2 | * | 3/2004 | Kube et al. ............... 360/245.9 |

(Continued)

FOREIGN PATENT DOCUMENTS

CN    98123990.0    8/1999

(Continued)

*Primary Examiner*—David Davis
(74) *Attorney, Agent, or Firm*—Hamre, Schumann, Mueller & Larson, P.C.

(57) ABSTRACT

To provide a disk apparatus that can enhance reliability of a head wiring and a driving wiring, a disk apparatus includes a head slider, an arm, a driving unit, a wiring body provided for supplying a head mounted on the head slider with a head current used for signal recording or reproduction with respect to a disk-like recording medium and supplying the driving unit with a driving current used to drive the arm to swing, and a lead-out terminal portion. The wiring body includes a flexure sheet provided in the arm so as to support the head slider, a head wiring provided so as to connect the head slider and the lead-out terminal portion by passing over the flexure sheet thereby to supply the head mounted on the head slider with the head current, and a driving wiring provided along the head wiring in an area ranging from a wiring connecting portion formed on a side of the flexure sheet opposite the head slider to the lead-out terminal portion thereby to supply the driving unit with the driving current.

18 Claims, 14 Drawing Sheets

U.S. PATENT DOCUMENTS

| | | | |
|---|---|---|---|
| 6,744,603 B1 | 6/2004 | Soeno et al. | 360/245.6 |
| 2001/0030836 A1* | 10/2001 | Katsumata | 360/244.1 |
| 2002/0148104 A1* | 10/2002 | Slife et al. | 29/603.03 |
| 2002/0181142 A1* | 12/2002 | Kokami et al. | 360/77.02 |
| 2002/0186508 A1* | 12/2002 | Kube et al. | 360/245.9 |
| 2003/0002222 A1* | 1/2003 | Abe | 360/264.2 |
| 2003/0086213 A1* | 5/2003 | Shin et al. | 360/266.3 |
| 2003/0086214 A1* | 5/2003 | Shin | 360/266.3 |
| 2005/0013051 A1* | 1/2005 | Katsumata | 360/244.1 |

FOREIGN PATENT DOCUMENTS

| | | |
|---|---|---|
| CN | 99802098.2 | 3/2001 |
| JP | 9-128728 | 5/1997 |
| JP | 11-203648 | 7/1999 |

* cited by examiner

WIRING BODY WITH FLEXURE SHEET CONNECTING THE HEAD SLIDER AND THE DRIVING UNIT IN A DISK APPARATUS

BACKGROUND OF THE INVENTION

1. Field of the Invention

The present invention relates to a wiring body for a disk apparatus provided for supplying a head mounted on a head slider with a head current used for signal recording or reproduction with respect to a disk-like recording medium and supplying a driving unit with a driving current used to allow an arm to swing, a method of manufacturing the same and a disk apparatus including the same.

2. Related Background Art

Disk apparatuses that perform signal recording/reproduction by using a disk-like recording medium (hereinafter, referred to simply as a "disk") such as a hard disk, an optical disk or the like have found wider applications in various kinds of information processing equipment beyond their conventional use in computers. Among such applications are storage apparatuses in the area of mobile information equipment typified by a mobile phone or the like. It has been requested that such storage apparatuses have a large capacity and allow high-speed access to desired information. As one form of the storage apparatuses, a magnetic disk apparatus has been under study.

In a magnetic disk apparatus, a head slider holding a magnetic head is mounted to one end of an arm that is held swingably. The arm is allowed to swing by a voice coil motor disposed on a side of the other end, and thus the magnetic head can be positioned on tracks formed on a rotatable disk so that signals can be recorded or reproduced. In order to prevent the reliability from being deteriorated due to the adhesion of dust or the like, these components are housed in a hermetic case.

Each head wiring for supplying the magnetic head with a head current and each driving wiring for supplying a voice coil motor with a driving current are connected at one end to a wiring connecting portion provided on a side face of the arm. Further, these wirings are connected to an external terminal provided in the case for connecting the wiring connecting portion to each of a signal processing system and a driving control system by a flexible wiring. Signal transmission and reception are performed between the magnetic head and the signal processing system through these wirings, and a driving current is supplied from the driving control system to the voice coil motor so as to allow the arm to swing. The above-described structure of a magnetic disk apparatus is disclosed specifically, for example, in JP 9(1997)-128728 A.

The above-mentioned conventional magnetic disk apparatus has presented the following problem. That is, in the wiring connecting portion provided in the arm, the head wirings for supplying the magnetic head with a head current and the driving wirings for supplying a driving current used to drive the voice coil motor are connected respectively to the flexible wiring used for the connection to external systems by soldering. This has been not only a cause of the complexity of an assembling operation but also a serious constraint to the improvement in wiring reliability due to an increased number of wiring connections.

Furthermore, with the size reduction of the apparatus itself, the arm has had a reduced size, resulting in a decrease in the mass of the arm. As the mass of the arm is decreased, variations in the mass of the wiring connecting portion may exert an adverse effect on the controlling of a swinging motion of the arm, which has been disadvantageous.

It is an object of the present invention to provide a disk apparatus that can improve reliability of a head wiring for supplying a magnetic head with a head current and a driving wiring for supplying a driving current used to drive a voice coil motor, a wiring body for the disk apparatus and a method of manufacturing the wiring body for the disk apparatus.

SUMMARY OF THE INVENTION

A disk apparatus according to the present invention includes a head slider mounting a head that performs signal recording or reproduction with respect to a disk-like recording medium, an arm provided swingably for setting the head mounted on the head slider to be in a desired position on the disk-like recording medium, a driving unit provided for allowing the arm to swing, a wiring body provided for supplying the head mounted on the head slider with a head current used for the signal recording or reproduction with respect to the disk-like recording medium and supplying the driving unit with a driving current used to allow the arm to swing, and a lead-out terminal portion provided for supplying the wiring body with the head current and the driving current. The wiring body includes a flexure sheet provided in the arm so as to support the head slider, a head wiring formed so as to connect the head slider to the lead-out terminal portion by passing over the flexure sheet thereby to supply the head mounted on the head slider with the head current, and a driving wiring formed along the head wiring in an area ranging from a wiring connecting portion formed in the flexure sheet to the lead-out terminal portion thereby to supply the driving unit with the driving current.

A wiring body for a disk apparatus according to the present invention is provided for supplying a head mounted on a head slider so as to perform signal recording or reproduction with respect to a disk-like recording medium with a head current used for the signal recording or reproduction with respect to the disk-like recording medium, and supplying a driving unit provided for allowing an arm to swing with a driving current used to allow the arm to swing. The arm is provided swingably so as to set the head mounted on the head slider to be in a desired position on the disk-like recording medium. The wiring body is supplied with the head current and the driving current from a lead-out terminal portion. The wiring body includes a flexure sheet formed in the arm so as to support the head slider, a head wiring formed so as to connect the head slider to the lead-out terminal portion by passing over the flexure sheet thereby to supply the head mounted on the head slider with the head current, and a driving wiring formed along the head wiring in an area ranging from the lead-out terminal portion to a wiring connecting portion formed in the flexure sheet thereby to supply the driving unit with the driving current.

A method of manufacturing a wiring body for a disk apparatus according to the present invention is a method of manufacturing a wiring body for a disk apparatus that is provided for supplying a head mounted on a head slider so as to perform signal recording or reproduction with respect to a disk-like recording medium with a head current used for the signal recording or reproduction with respect to the disk-like recording medium, and supplying a driving unit provided for allowing an arm to swing with a driving current used to allow the arm to swing. The arm is provided swingably so as to set the head mounted on the head slider to be in a desired position on the disk-like recording medium. The method includes the steps of: forming a first insulation film in which the first insulation film is formed on a metal sheet; forming wirings in which a plurality of head wirings, for connecting the head slider to a lead-out terminal portion thereby to supply the head with the head current, are formed respectively on the first insulation film, and a driving wiring for supplying the driving unit with the driving current is formed on the first insulation film along a part of each of the head wirings; forming a second insulation film in which the second insulation film is formed on the first insulation film so that each of the head wirings and the driving wirings is coated with the second insulation film; and etching in which the metal sheet is etched to form a plurality of flexure sheets provided in the arm so as to support the head slider.

DETAILED DESCRIPTION OF THE INVENTION

Figure 1:
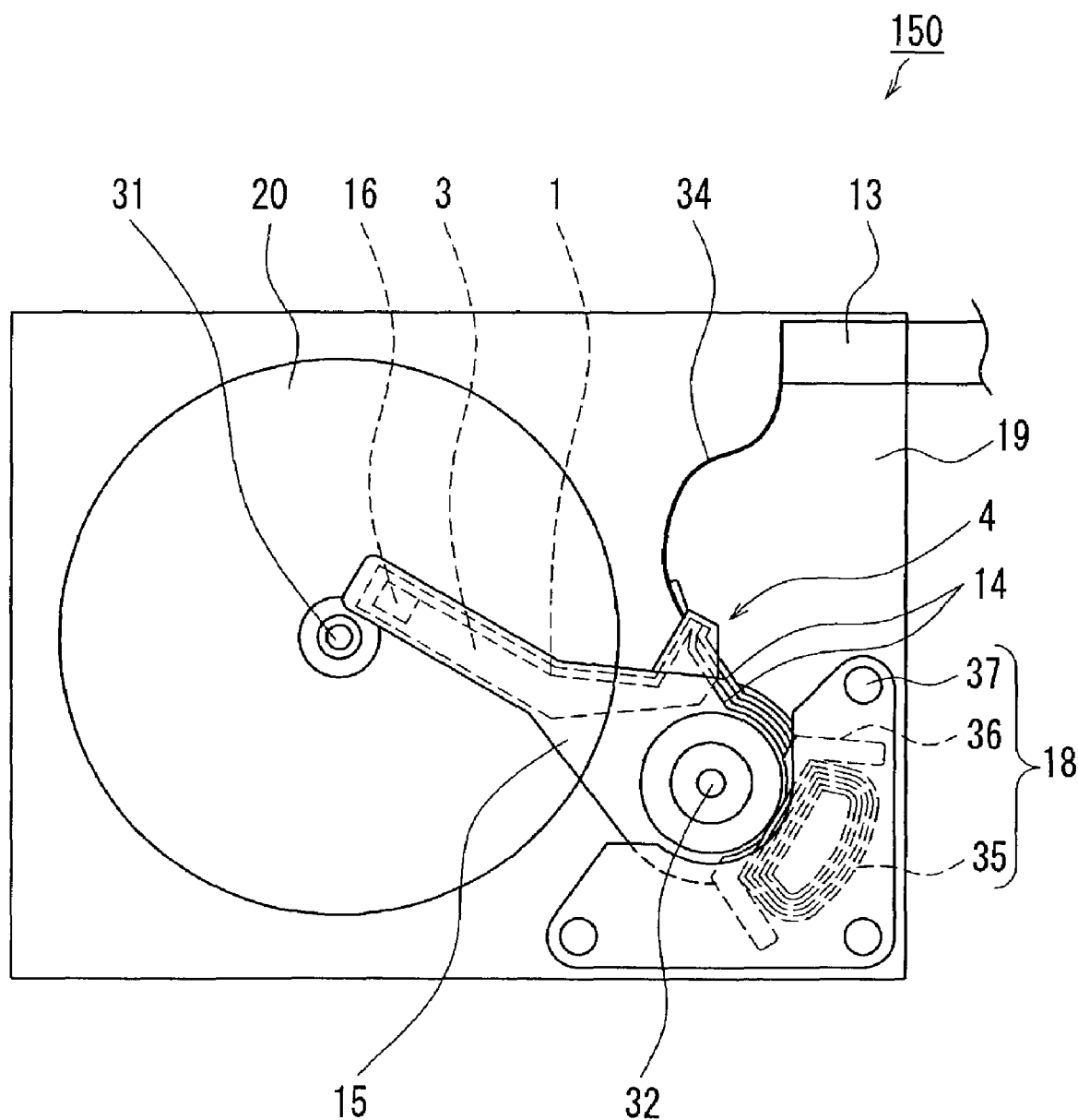
FIG. 1 is a plan view showing a configuration of a disk apparatus according to Embodiment 1.

In a disk apparatus according to this embodiment, a head wiring for supplying a head mounted on a head slider with a head current is provided by passing over a flexure sheet so that a lead-out terminal portion provided for supplying a wiring body with the head current and a driving current is connected to the head slider. Accordingly, the head wiring is configured so as to be continuous from the head slider to the lead-out terminal portion. Thus, it is no longer necessary to form, on the head wiring on an arm, a contact for wiring junction used to supply the head current. As a result, a disk apparatus having high reliability of wiring junction for supplying a head current can be provided.

Preferably, the flexure sheet is formed of a first metal sheet, and a second metal sheet is formed selectively along the head wiring and the driving wiring in the area ranging from the wiring connecting portion to the lead-out terminal portion.

Preferably, the first metal sheet and the second metal sheet are made of the same material and have the same thickness.

Preferably, the disk apparatus further includes a piezoelectric actuator provided in the flexure sheet so as to allow the head mounted on the head slider to be displaced finely and an actuator wiring provided so as to connect the piezoelectric actuator to the lead-out terminal portion by passing over the flexure sheet thereby to supply the piezoelectric actuator with a piezoelectric actuator current used to drive the piezoelectric actuator so that the head is displaced finely.

Preferably, the flexure sheet is formed of a metal sheet having a bent portion that is bent in the wiring connecting portion.

Preferably, the bent portion is bent along a direction substantially perpendicular to a surface of the disk-like medium.

Preferably, the disk apparatus further includes a feeding wiring connected to the driving wiring in the wiring connecting portion so as to supply the driving unit with the driving current.

Preferably, the driving unit is a voice coil motor.

Preferably, the disk apparatus further includes a case provided for supporting the arm, the driving unit and the lead-out terminal portion.

Preferably, a gimbal spring portion for supporting the head slider is formed in the flexure sheet.

Preferably, one head is mounted on the head slider.

Preferably, each of the driving wiring and a part of the head wiring formed along the driving wiring is configured so that elastic deflection or deformation is caused according to a swinging motion of the arm.

Preferably, each of the driving wiring and a part of the head wiring formed along the driving wiring is formed into an arch in the area between the lead-out terminal portion and the wiring connecting portion formed in the flexure sheet.

In a wiring body for a disk apparatus according to this embodiment, a head wiring for supplying a head mounted on a head slider with a head current is provided by passing over a flexure sheet so that a lead-out terminal portion provided for supplying the wiring body with the head current and a driving current is connected to the head slider. Accordingly, the head wiring is configured so as to be continuous from the head slider to the lead-out terminal portion. Thus, it is no longer needed to form, on the head wiring on an arm, a contact for wiring junction used to supply the head current. As a result, a wiring body for a disk apparatus having high reliability of wiring junction for supplying a head current can be provided.

Preferably, the wiring body further includes a connecting terminal portion provided so that the head wiring and the driving wiring are connected to the lead-out terminal portion.

Preferably, the flexure sheet is formed of a first metal sheet, and a second metal sheet is formed selectively along the head wiring and the driving wiring in an area ranging from the connecting terminal portion to the wiring connecting portion.

Preferably, the first metal sheet and the second metal sheet are made of the same material and have the same thickness.

Preferably, a plurality of the second metal sheets are formed selectively at a predetermined distance from each other along a direction substantially perpendicular to a longitudinal direction of the driving wiring.

Preferably, a plurality of the second metal sheets are formed selectively at a predetermined distance from each other along a longitudinal direction of the driving wiring.

Preferably, the second metal sheet is formed selectively along a longitudinal direction of the driving wiring.

Preferably, each of the head wiring and the driving wiring is coated with an insulating member formed on the flexure sheet.

In a method of manufacturing a wiring body for a disk apparatus according to this embodiment, a plurality of head wirings are formed respectively so as to connect a head slider to a lead-out terminal portion thereby to supply a head with a head current. Accordingly, the head wirings are configured so as to be continuous from the head slider to the lead-out terminal portion. Thus, it is no longer needed to form, on the head wiring on an arm, a contact for wiring junction used to supply the head current. As a result, a method of manufacturing a wiring body for a disk apparatus that can achieve high reliability of wiring junction for supplying a head current can be provided.

Preferably, in the step of etching, the metal sheet is etched so that the metal sheet can remain selectively on the first insulation film in a region in which the driving wiring is formed along the part of each of the head wirings in the step of forming wirings.

Preferably, in the step of etching, the metal sheet is etched so that the metal sheet can remain selectively in a form of pieces spaced at a predetermined distance from each other along a direction substantially perpendicular to a longitudinal direction of the driving wiring in a region in which the driving wiring is formed along the part of each of the head wirings in the step of forming wirings.

Preferably, in the step of etching, the metal sheet is etched so that the metal sheet can remain selectively in a form of pieces spaced at a predetermined distance from each other along a longitudinal direction of the driving wiring in a region in which the driving wiring is formed along the part of each of the head wirings in the step of forming wirings.

Preferably, in the step of etching, the metal sheet is etched so that the metal sheet can remain selectively along a longitudinal direction of the driving wiring in a region in which the driving wiring is formed along the part of each of the head wirings in the step of forming wirings.

Hereinafter, the present invention will be described by way of embodiments with reference to appended drawings.

(Embodiment 1)

FIG. 1 is a plan view showing a configuration of a disk apparatus 150 according to Embodiment 1. The disk apparatus 150 includes a case 19 having substantially the shape of a board. A main shaft 31 having substantially a cylindrical shape is provided in the case 19. A disk 20 having a disk shape is mounted to the main shaft 31. The disk 20 is driven to rotate by a driving unit directly coupled to the main shaft 31, which is not shown. The driving unit is formed of, for example, a spindle motor.

In the case 19, a bearing portion 32 having substantially a cylindrical shape is provided at a position close to the disk 20. In the bearing portion 32, an arm 15 is provided swingably around the bearing portion 32. At an end of the arm 15 on a side of the disk 20, a head slider 16 having substantially the shape of a rectangular solid is provided. A head 17 (FIG. 4) used for signal recording or reproduction with respect to the disk 20 is mounted on the head slider 16. The arm 15 is provided swingably so that the head 17 mounted on the head slider 16 is set to be in a predetermined position on the disk 20.

In the case 19, a voice coil motor 18 is provided on a side opposite the disk 20 with respect to the bearing portion 32. The voice coil motor 18 allows the arm 15 to swing so that the head 17 mounted on the head slider 16 is set to be in a predetermined position on the disk 20. In the voice coil motor 18, a flat coil 35 is provided. The voice coil motor 18 includes a yoke 36 provided so that the flat coil 35 is interposed between both ends of the yoke 36. The voice coil motor 18 is fixed to the case 19 by a screw 37.

Figure 2:
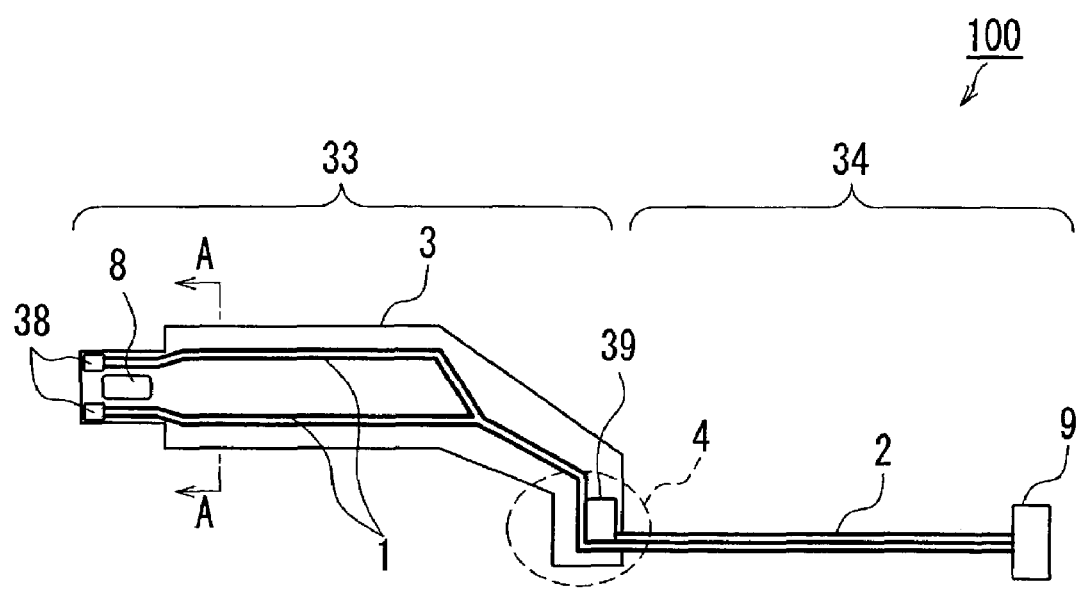
FIG. 2 is a schematic plan view showing a configuration of a wiring body provided in the disk apparatus according to Embodiment 1.
Figure 3:
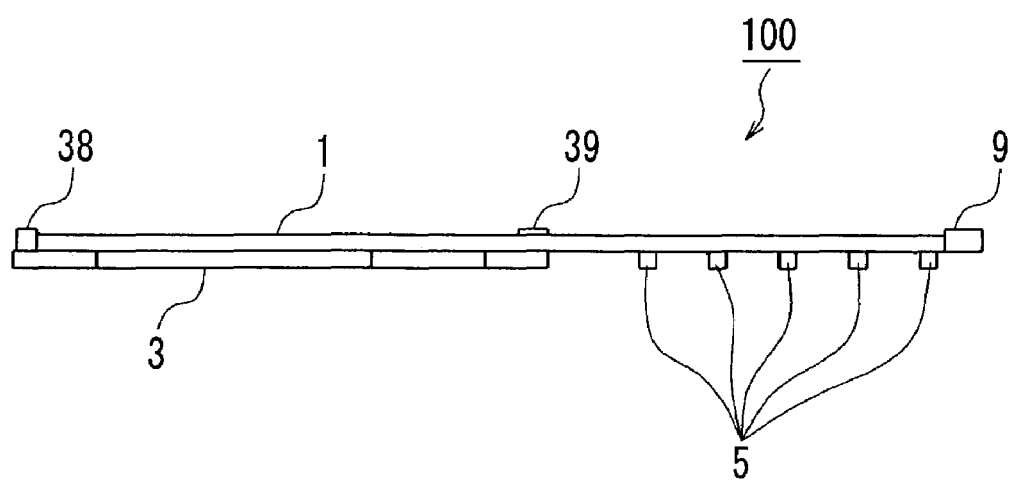
FIG. 3 is a schematic front view showing the configuration of the wiring body provided in the disk apparatus according to Embodiment 1.
Figure 4:
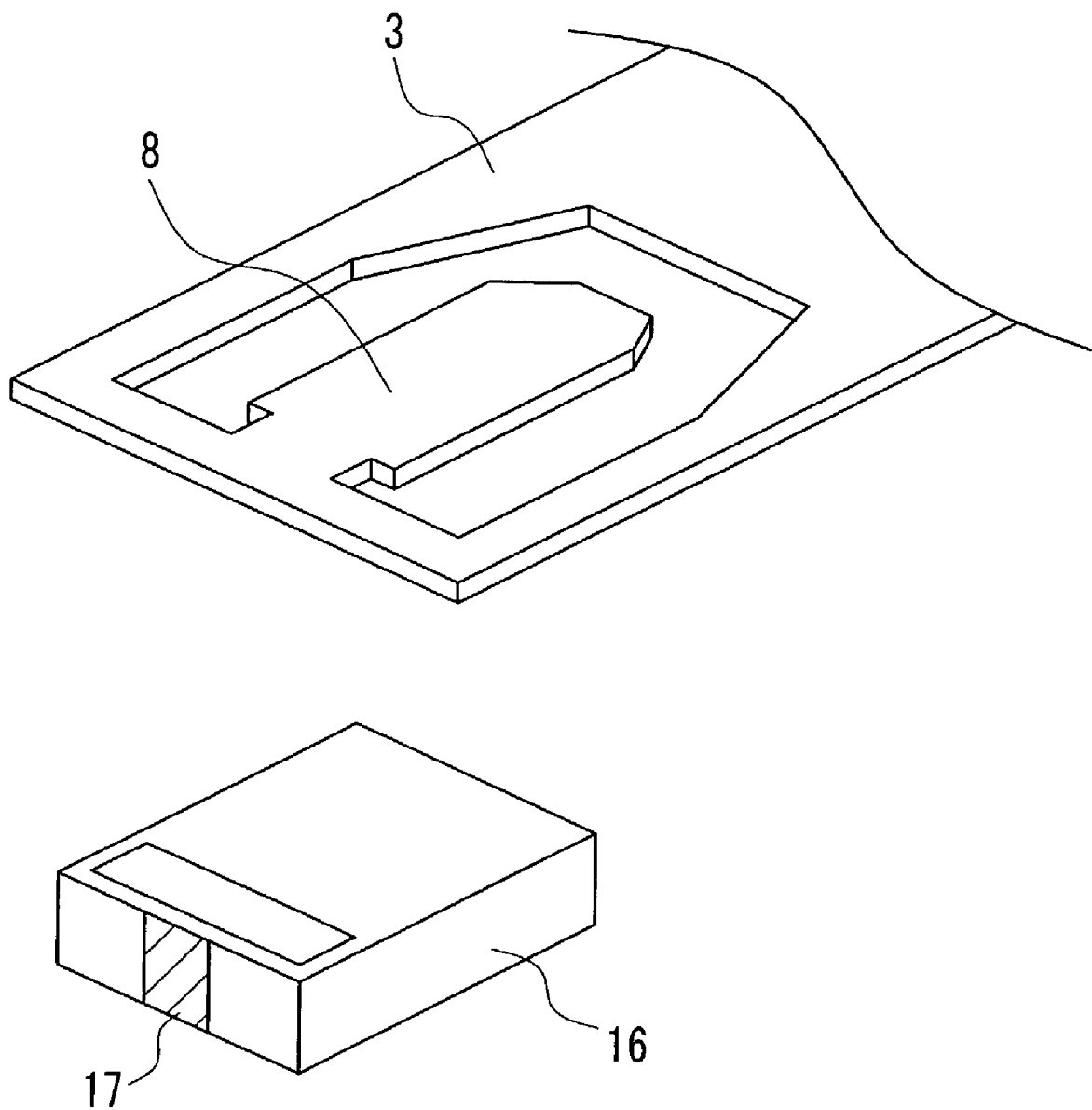
FIG. 4 is a perspective view for explaining a configuration of a gimbal spring portion for supporting a head slider provided in a flexure sheet of the wiring body according to Embodiment 1.
Figure 5:
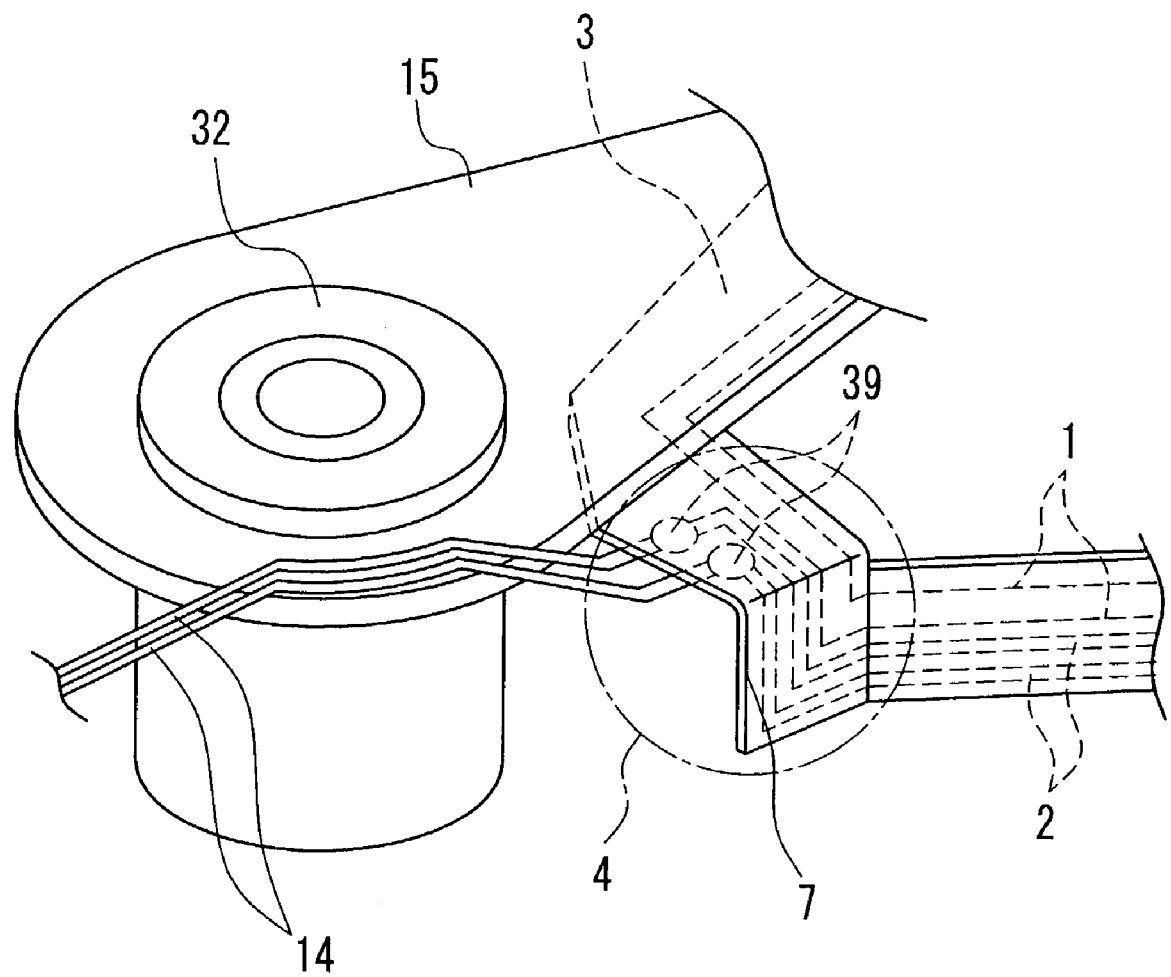
FIG. 5 is a perspective view for explaining a configuration of a wiring connecting portion of the flexure sheet provided in the wiring body according to Embodiment 1.

The disk apparatus 150 includes a wiring body 100. FIGS. 2 and 3 are a schematic plan view and a schematic front view, respectively, which show a configuration of the wiring body 100. FIG. 4 is a perspective view for explaining a configuration of a gimbal spring portion of a flexure sheet provided in the wiring body 100. FIG. 5 is a perspective view for explaining a configuration of a wiring connecting portion of the flexure sheet provided in the wiring body 100.

The wiring body 100 is provided for supplying the head 17 mounted on the head slider 16 with a head current used for signal recording or reproduction with respect to the disk 20 and supplying the voice coil motor 18 with a driving current used to allow the arm 15 to swing. The wiring body 100 is composed of a fixed flexure portion 33 and a flexible wiring portion 34. The fixed flexure portion 33 includes a flexure sheet 3. The flexure sheet 3 is formed of a metal sheet and provided in the arm 15 on the side of the disk 20 so as to support the head slider 16. At an end of the flexure sheet 3 on a side opposite the voice coil motor 18, a gimbal spring portion 8 for supporting the head slider 16 is formed.

On a side of the flexure sheet 3 opposite the head slider 16, a wiring connecting portion 4 is formed so as to project from the arm 15 toward a direction substantially perpendicular to a longitudinal direction of the arm 15. A bent portion 7 bent along a direction substantially perpendicular to a surface of the disk 20 is formed in the wiring connecting portion 4 of the flexure sheet 3.

On a side of the bent portion 7 of the flexure sheet 3, a lead-out terminal portion 13 provided for supplying the wiring body 100 with the head current and the driving current is fixed to the case 19.

The wiring body 100 includes head wirings 1. The head wirings 1 are formed so as to connect the head slider 17 to the lead-out terminal portion 13 by passing over the flexure sheet 3, thereby to supply the head 17 mounted on the head slider 16 with the head current.

Figure 6:
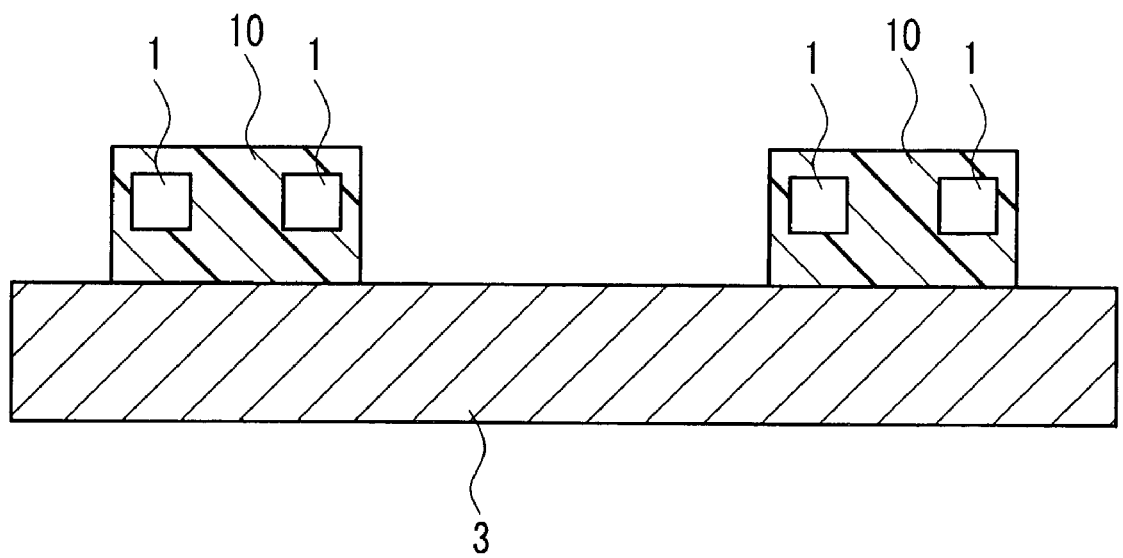
FIG. 6 is a cross sectional view taken on line A—A shown in FIG. 2.

FIG. 6 is a cross sectional view taken on line A—A shown in FIG. 2. Each of the head wirings 1 is coated with an insulating member 10 formed on the flexure sheet 3. The flexure sheet 3 has a thickness of about 25 μm, and the head wirings 1 have a thickness of about 12 μm. The insulating member 10 has a thickness of about 10 μm on a lower side of the head wiring 1 and a thickness of about 3 μm on an upper side of the head wiring 1.

Driving wirings 2 are provided in the wiring body 100. The driving wirings 2 are formed along the head wirings 1 in an area ranging from the wiring connecting portion 4 to the lead-out terminal portion 13 so that the voice coil motor 18 is supplied with the driving current. Each of the driving wirings 2 and a part of each of the head wirings 1 formed along the driving wiring 2 is formed into an arch in an area between the lead-out terminal portion 13 and the wiring connecting portion 4 formed in the flexure sheet 3.

The flexible wiring portion 34 includes a connecting terminal portion 9. The connecting terminal portion 9 is provided so that the head wirings 1 and the driving wirings 2 are connected to the lead-out terminal portion 13.

Figure 7:
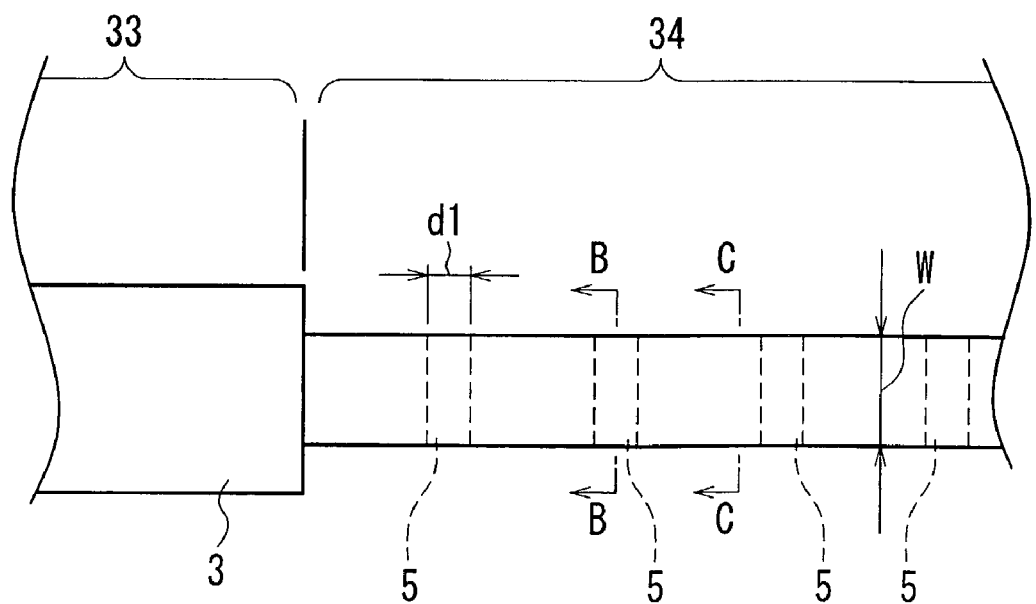
FIG. 7 is a schematic plan view showing a configuration of a flexible wiring portion of the wiring body shown in FIG. 2.

FIG. 7 is a schematic plan view showing a configuration of the flexible wiring portion 34 of the wiring body 100 shown in FIG. 2. Referring to FIGS. 3 and 7, in the flexible wiring portion 34, a plurality of metal sheets 5 are formed selectively at a predetermined distance from each other along a direction substantially perpendicular to a longitudinal direction of the driving wiring 2. A total width W of the respective widths of the head wiring 1 and the driving wiring 2 is about 1 mm. Each of the metal sheets 5 has the shape of a strap and a width d1 of about 100 μm. The metal sheets 5 and the metal sheet constituting the flexure sheet 3 are made of the same material and have the same thickness.

Figure 8:
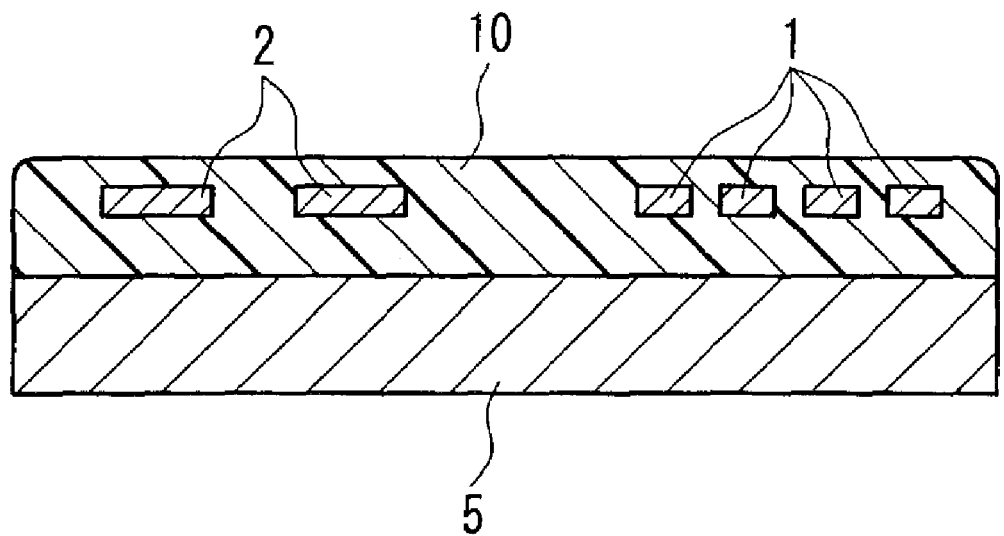
FIG. 8 is a cross sectional view taken on line B—B shown in FIG. 7.
Figure 9:
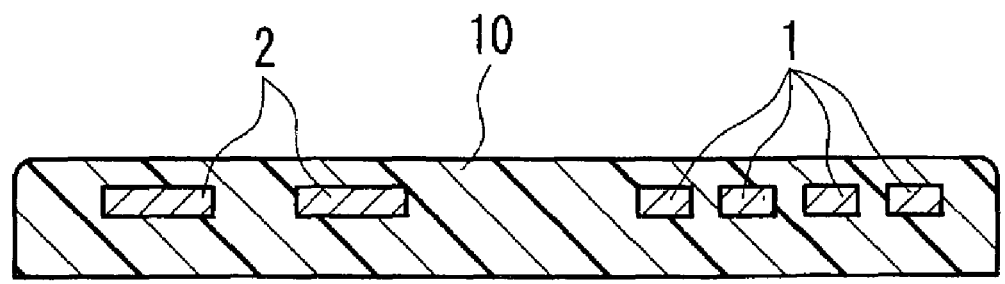
FIG. 9 is a cross sectional view taken on line C—C shown in FIG. 7.

FIG. 8 is a cross sectional view taken on line B—B shown in FIG. 7, and FIG. 9 is a cross sectional view taken on line C—C shown in FIG. 7. Four head wirings 1 and two driving wirings 2 are coated with the insulating member 10. The metal sheets 5 are formed on the insulating member 10.

Referring back to FIGS. 1 and 5, feeding wirings 14 are provided in the arm 15. The feeding wirings 14 are connected to the driving wirings 2 at feeding connection terminals 39 formed in the wiring connecting portion 4 so that the voice coil motor 18 is supplied with the driving current.

Figure 10:
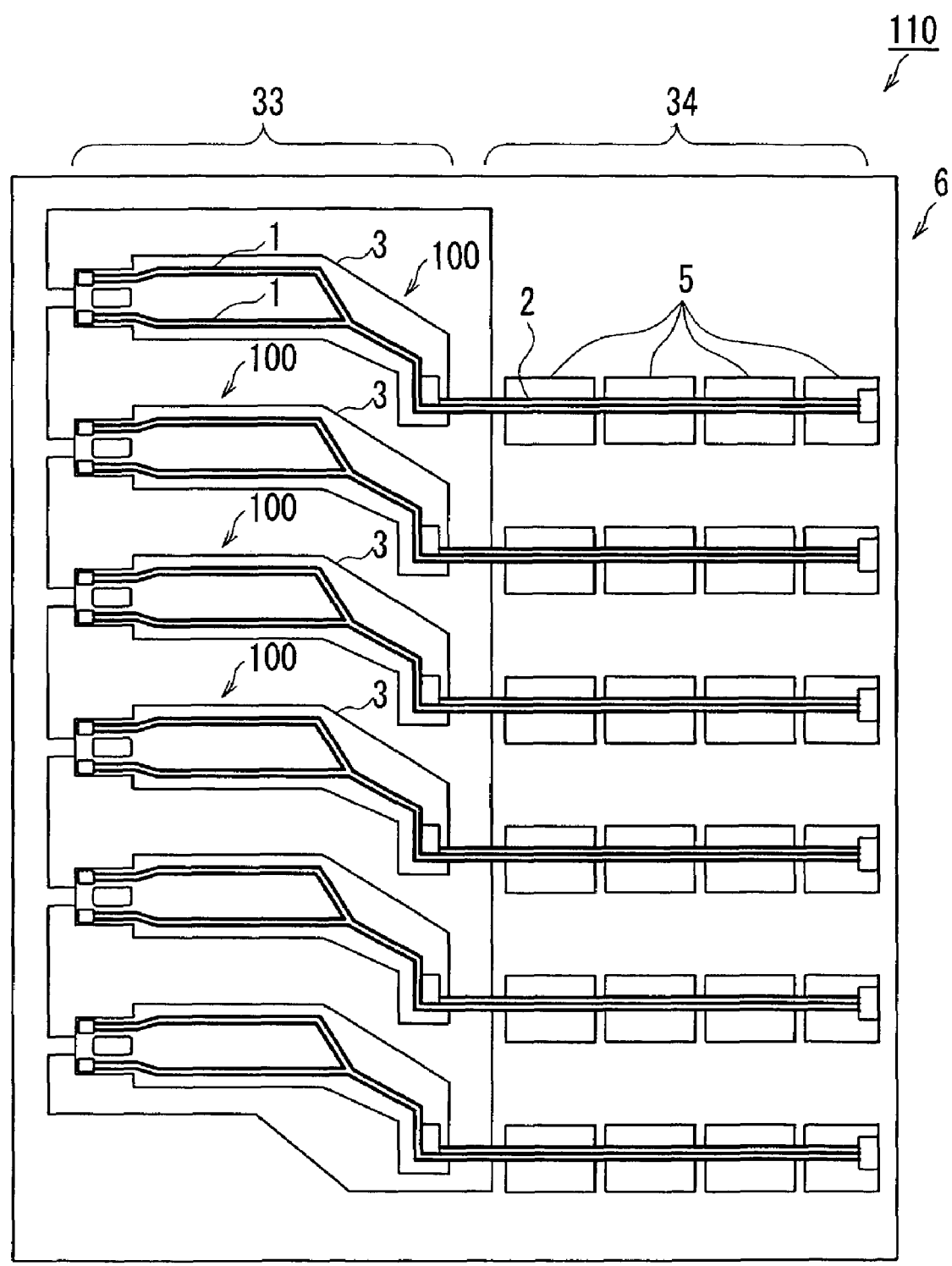
FIG. 10 is a plan view for explaining a method of manufacturing the wiring body according to Embodiment 1.
Figure 11:
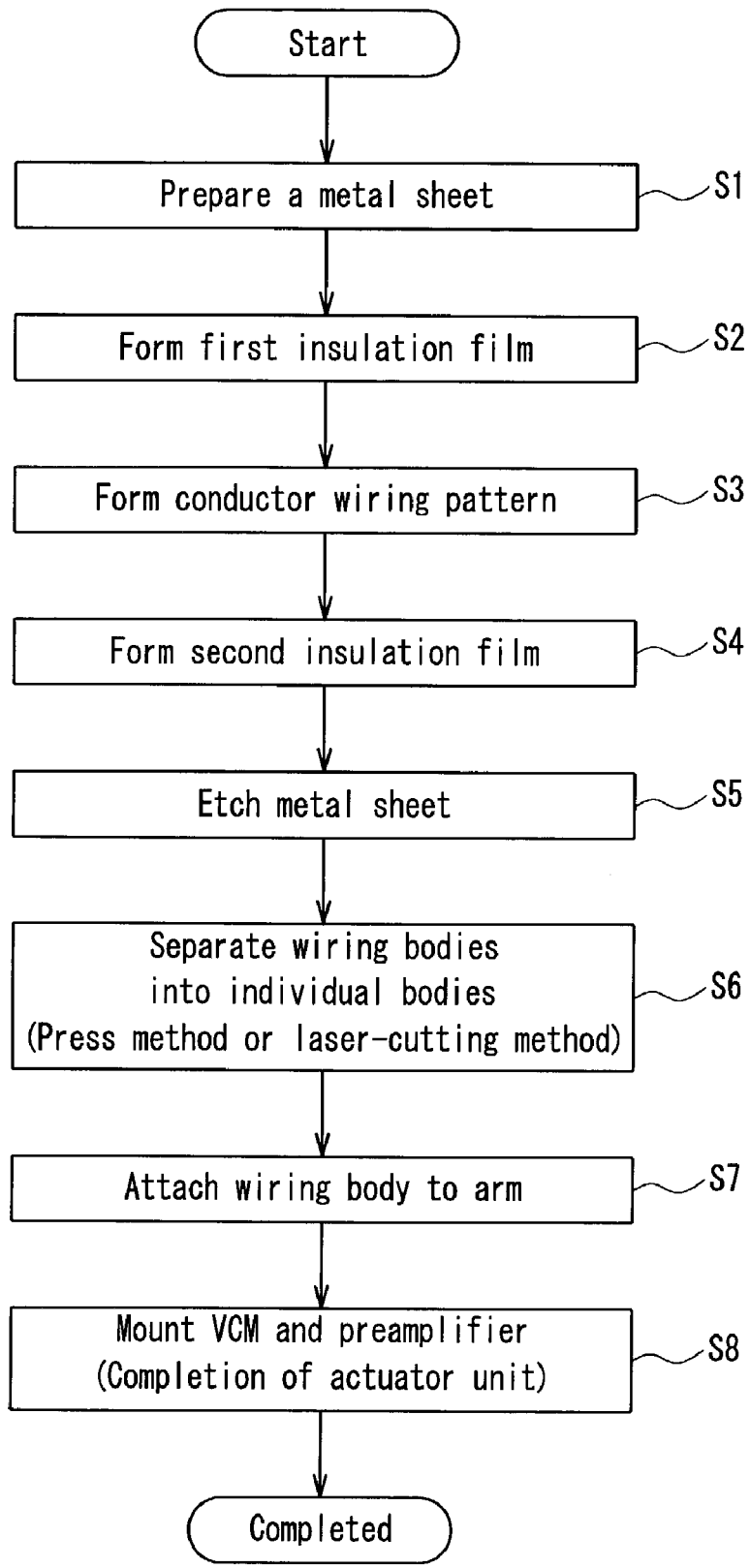
FIG. 11 is a flow chart showing the method of manufacturing the wiring body according to Embodiment 1.

The wiring body 100 with the above-described configuration is manufactured in the following manner. FIG. 10 is a plan view for explaining a method of manufacturing the wiring body 100, and FIG. 11 is a flow chart showing the method of manufacturing the wiring body 100.

Initially, a metal sheet 110 having a rectangular shape that is used to obtain a plurality of the wiring bodies 100 is prepared (Step S1). FIG. 10 shows an example in which six wiring bodies 100 are obtained from one metal sheet 110. Then, a first insulation film is formed on the metal sheet 110 so as to have a thickness of about 10 μm (Step S2).

Next, each of the head wirings 1 and the driving wirings 2 is formed into a predetermined pattern shown in FIG. 10 so as to have a thickness of about 12 μm by a copper foil embedding method or a screen printing method (Step S3). After that, a second insulation film of about 15 μm thickness is formed on the first insulation film so that each of the head wirings 1 and the driving wirings 2 is coated with the second insulation film (Step S4). The first insulation film and the second insulation film are made of resin and formed by the screen printing method or an etching method.

Then, the metal sheet 110 is etched so that flexure sheets 3 are formed respectively, and each of the metal sheets 5 is allowed to remain (Step S5).

In the above-described manner, one component in a sheet form in which each of six flexure-integrated wiring bodies 100 is coupled to the metal sheets remaining in the vicinity thereof at a predetermined part can be obtained. Next, these flexure-integrated wiring bodies 100 are separated into individual bodies by a press method or a laser-cutting method (Step S6). After that, the wiring body 100 as an individual body is attached to the arm 15 (Step S7). Next, the driving wirings 2 provided in the wiring body 100 are connected to the feeding wirings 14 connected to the voice coil motor 18 (VCM) at the feeding connection terminals 39. Then, the connecting terminal portion 9, which is connected to the head wirings 1 and the driving wirings 2 that are provided in the wiring body 100, is connected to the lead-out terminal portion 13 (Step S8). This completes the manufacturing of an actuator unit.

The following description is directed to an operation of the disk apparatus 150 with the above-described configuration. Initially, when the disk 20 is driven to rotate by a spindle motor that is not shown, a driving current used to allow the arm 15 to swing is supplied from the lead-out terminal portion 13 to the voice coil motor 18 through the driving wirings 2 provided in the wiring body 100 and the feeding wirings 14.

Then, the voice coil motor allows the arm 15 to swing so that the head 17 mounted on the head slider 16 is set to be in a predetermined position on the disk 20 based on the supplied driving current. Next, an elastic deflection or deformation is caused in each of the head wirings 1 and the driving wirings 2 in the flexible wiring portion 34 of the wiring body 100 according to a swinging motion of the arm 15.

Figure 12:
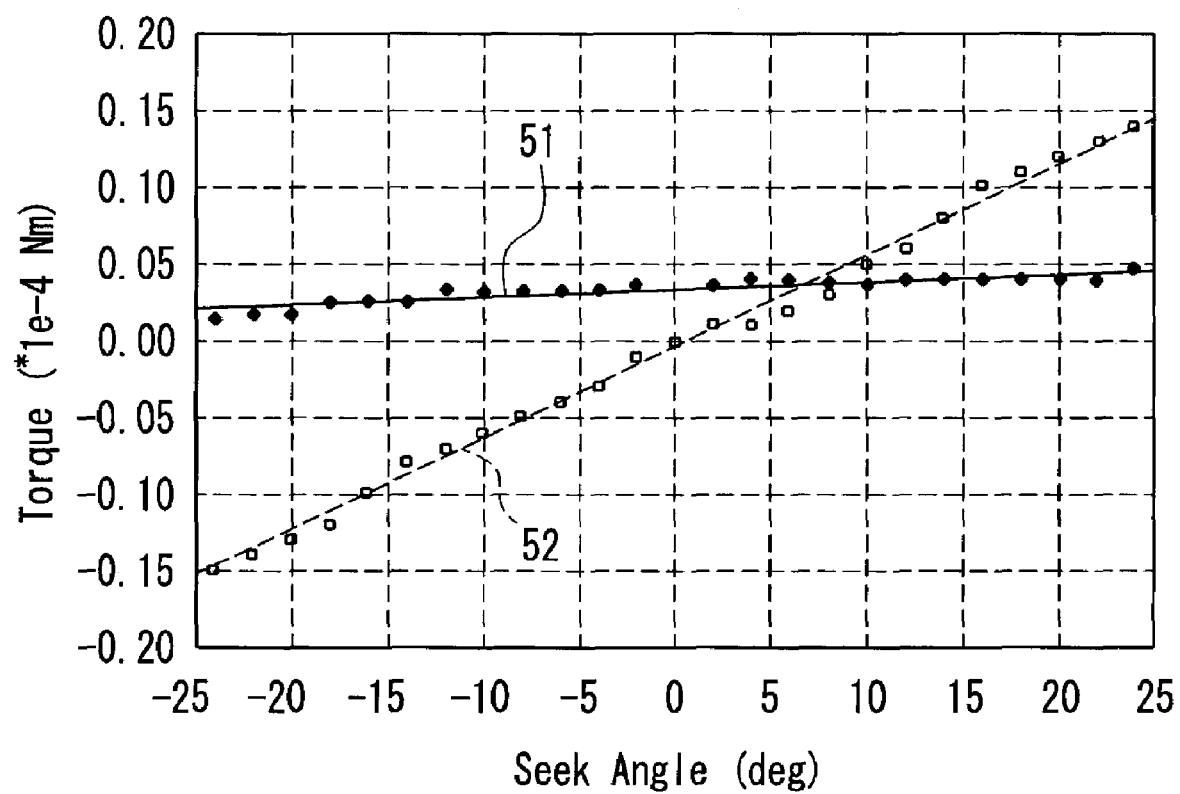
FIG. 12 is a graph showing a relationship between a bias torque and a swing angle of an arm in the disk apparatus according to Embodiment 1.

FIG. 12 is a graph showing a relationship between a bias torque and a seek angle of the arm 15 in the disk apparatus 150 according to Embodiment 1. A lateral axis indicates a seek angle of the arm 15 that varies according to the swinging motion of the arm 15. A vertical axis indicates a bias torque generated in the head wirings 1 and the driving wirings 2 (flexible printed board (FPC)) in the flexible wiring portion 34 of the wiring body 100. A straight line 51 represents a relationship between the bias torque and the seek angle of the arm in the disk apparatus 150 according to Embodiment 1. A straight line 52 represents a relationship between a bias torque and a seek angle of an arm in a conventional disk apparatus.

The bias torque in the conventional disk apparatus represented by the straight line 52 has a value of about $0.15 \times e^{-4}$ Nm at a seek angle of 25 degrees and a value of about $-0.15 \times e^{-4}$ Nm at a seek angle of $-25$ degrees. Accordingly, the bias torque in the conventional disk apparatus has a value of about $0.3 \times e^{-4}$ Nmp–p. On the other hand, the bias torque in the disk apparatus 150 according to Embodiment 1 has a value of about $0.05 \times e^{-4}$ Nm at a seek angle of 25 degrees and a value of about $0.01 \times e^{-4}$ Nm at a seek angle of $-25$ degrees. Accordingly, the bias torque in the disk apparatus 150 according to Embodiment 1 has a value of about $0.04 \times e^{-4}$ Nmp–p. Thus, the bias torque in the disk apparatus 150 according to Embodiment 1 can be made much lower than the bias torque obtained in a conventional configuration.

A driving load on the voice coil motor 18 includes a load on a pivot bearing, a lamp load, a load on a FPC or the like. As disk apparatuses have been made more compact and thinner, it has been demanded that a voice coil motor have a reduced size and thickness. Size and thickness reductions of a voice coil motor result in a decrease in a torque generated in the voice coil motor. Thus, the driving load of the voice coil motor 18 originating in, for example, the load on a pivot bearing, the lamp load or the load on a FPC needs to be reduced.

As shown in FIG. 12, the load of an FPC varies according to a seek angle of an arm. The load of the FPC always is applied to the arm, and therefore, the load of the FPC becomes a disturbance in a control system of the arm. Thus, it is required that the load of the FPC be reduced to a minimum. According to Embodiment 1, the bias torque is made much lower than the bias torque obtained in the conventional configuration, thereby allowing the load of the FPC to be reduced considerably.

The wiring body according to Embodiment 1 can be effective particularly with respect to compact disk apparatuses having a low torque generated in a voice coil motor. Specifically, the wiring body is highly effective with respect to a disk apparatus having a size of 1 inch (42.8 mm in width×36.4 mm in depth×5.0 mm in height) in which a voice coil motor is reduced extremely in volume or a disk apparatus having a size smaller than 1 inch.

In the wiring body 100 according to Embodiment 1, the respective metal sheets 5 are formed along the direction substantially perpendicular to the longitudinal direction of the driving wiring 2. This allows the rigidity along the direction substantially perpendicular to the longitudinal direction to be increased, so that falling of the flexible wiring portion 34 toward a vertical direction can be suppressed. Thus, an elastic deflecting or deforming operation of the flexible wiring portion 34 formed into an arch can be performed smoothly according to the swinging motion of the arm 15.

As described above, according to Embodiment 1, the head wirings 1 for supplying the head 17 mounted on the head slider 16 with the head current are provided by passing over the flexure sheet 3 so that the lead-out terminal portion 13 provided for supplying the wiring body 100 with the head current and the driving current is connected to the head slider 16. Accordingly, the head wirings 1 are configured so as to be continuous from the head slider 16 to the lead-out terminal portion 13. Thus, it is no longer needed to form, on the head wiring on the arm, a contact for a wiring junction used to supply the head current. As a result, a disk apparatus having a highly reliable wiring junction for supplying the head current can be provided.

Furthermore, in the wiring connecting portion, it is no longer needed to form a contact for the head wiring, thereby improving workability for the assembling of the disk apparatus.

Moreover, variations in controlling of the arm ascribable to mass variations of the contact can be suppressed when forming the contact by soldering or the like. Further, in an area in which the wirings can be moved, at least a part of the metal sheet having a high rigidity is removed, thereby improving the flexibility of the flexible wring portion. As a result, a reaction force generated in the flexible wiring portion when the arm is allowed to swing can be reduced.

In addition, breaking of wiring or the like can be prevented from occurring in the course of manufacturing or assembling of the wiring body, thereby allowing high-yield manufacturing of a wiring body to be achieved.

Figure 13:
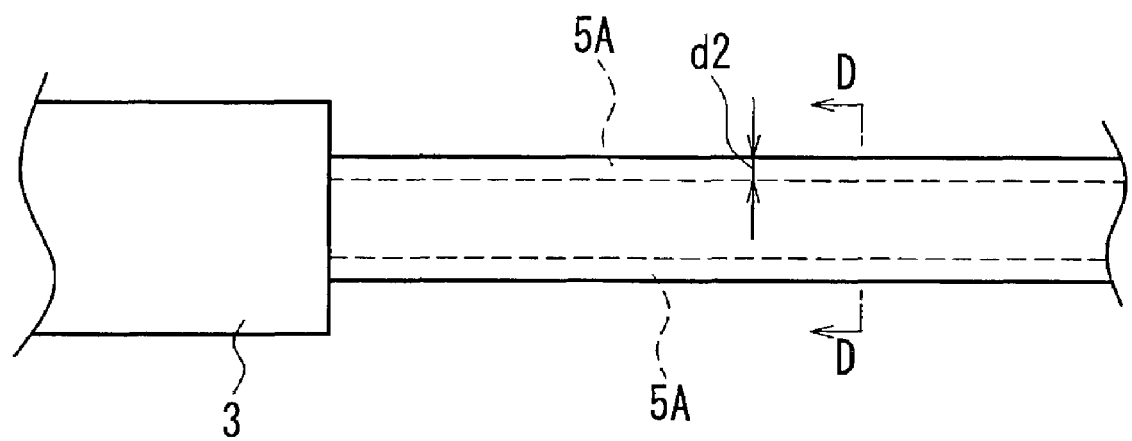
FIG. 13 is a schematic plan view showing another configuration of the flexible wiring portion of the wiring body shown in FIG. 2.
Figure 14:
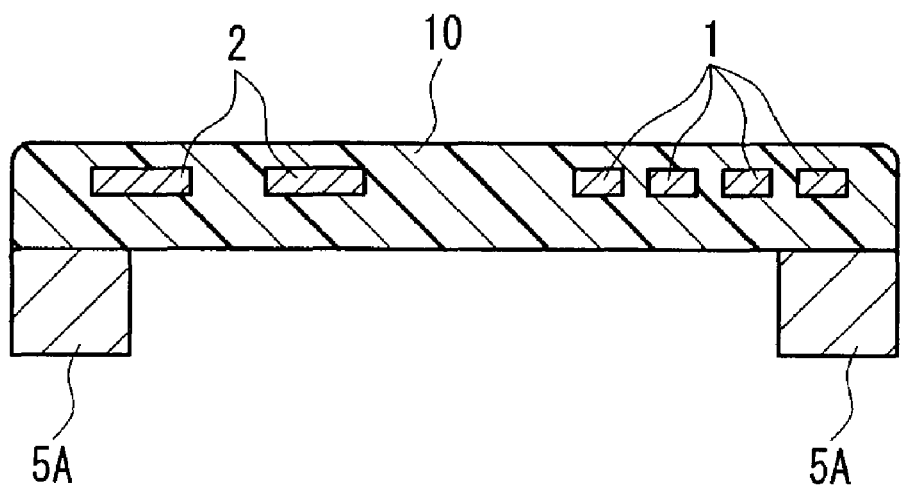
FIG. 14 is a cross sectional view taken on line D—D shown in FIG. 13.

FIG. 13 is a schematic plan view showing another configuration of the flexible wiring portion of the wiring body shown in FIG. 2. FIG. 14 is a cross sectional view taken along line D—D shown in FIG. 13. In the flexible wiring portion, two metal sheets 5A may be formed selectively at a predetermined distance from each other along a longitudinal direction of the driving wirings. Each of the metal sheets 5A has a width d2 of about not more than several hundred microns. Four head wirings 1 and two driving wirings 2 are coated with an insulating member 10. The two metal sheets 5A are formed on the insulating member 10.

Figure 15:
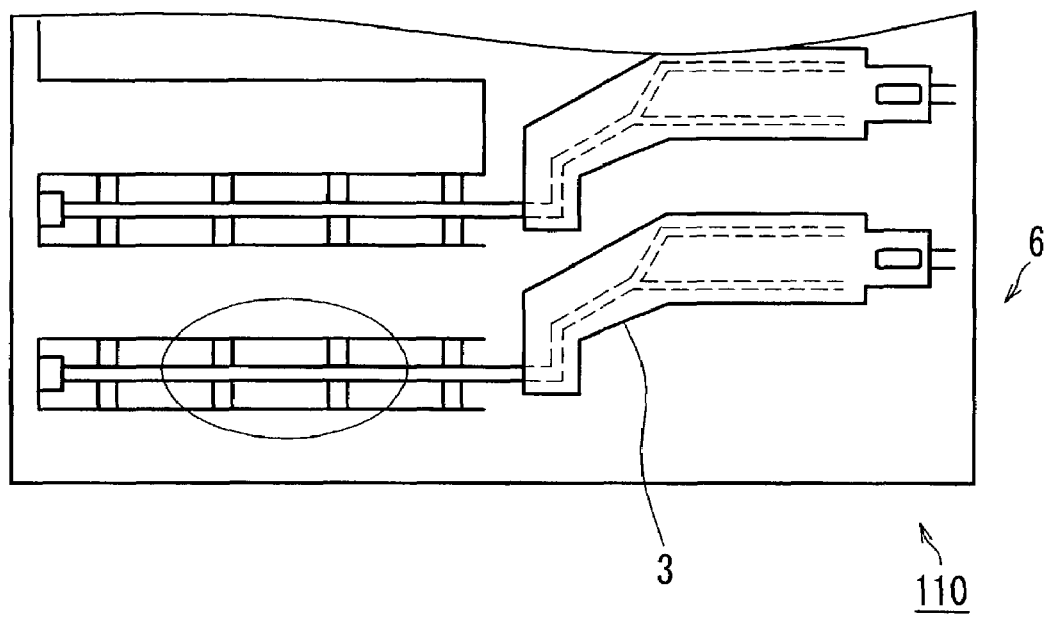
FIG. 15 is a plan view for explaining another method of manufacturing the wiring body according to Embodiment 1.
Figure 16:
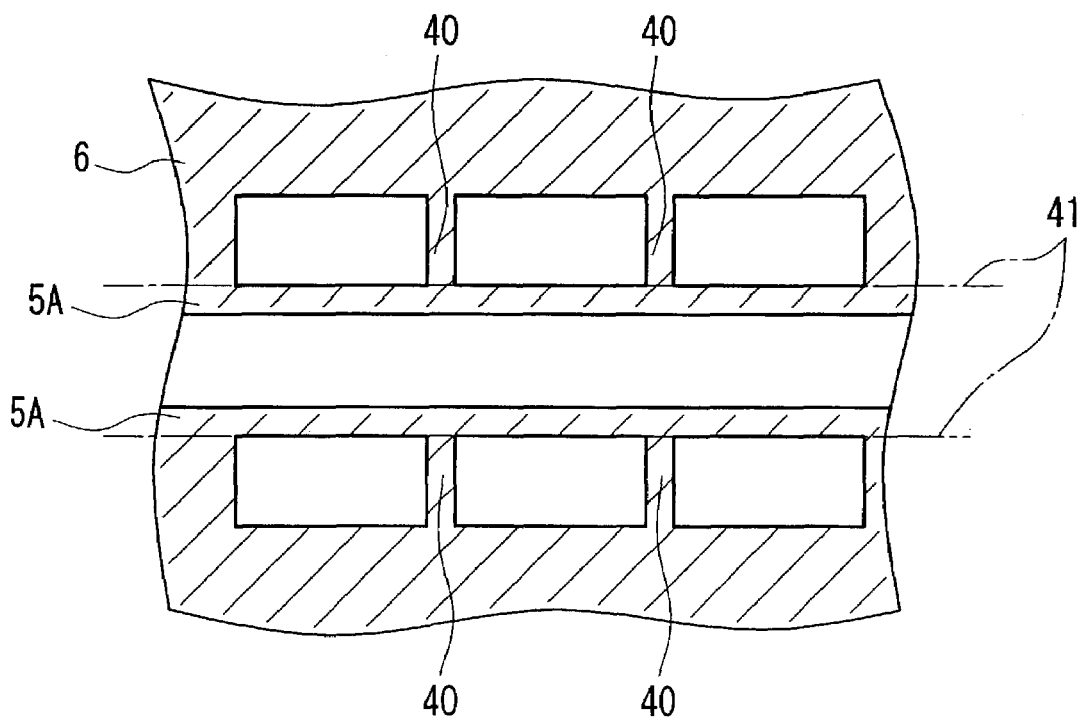
FIG. 16 is a detailed plan view for explaining another method of manufacturing the wiring body according to Embodiment 1.

FIG. 15 is a plan view for explaining another method of manufacturing the wiring body 100 according to Embodiment 1. FIG. 16 is a detailed plan view for explaining another method of manufacturing the wiring body 100 according to Embodiment 1. In the same manner as in the manufacturing method described above with reference to FIG. 10, initially, a metal sheet 110 is prepared, and a first insulation film is formed on the metal sheet. The head wirings 1 and the driving wirings 2 are formed respectively into a predetermined pattern, and a second insulation film is formed on the first insulation film so that each of the head wirings 1 and the driving wirings 2 is coated with the second insulation film.

Then, the metal sheet is etched so that flexure sheets 3 are formed respectively, and each of the metal sheets 5A is allowed to remain. In the above-described manner, one component can be obtained in a sheet form in which each of flexure-integrated wiring bodies is coupled to the metal sheets remaining in the vicinity thereof at a predetermined part. Next, these flexure-integrated wiring bodies are separated into individual bodies by the press method or the laser-cutting method.

As described above, according to this embodiment, in manufacturing each component in the sheet form of a plurality of wiring bodies, the rigidity of a flexible wiring portion can be secured. This enables positioning of the flexible wiring portion when the wiring bodies are separated into individual bodies, and thus wiring can be prevented from being broken, thereby allowing the manufacturing yield to be improved. In the flexure-integrated wiring body as an individual body, a belt-like metal portion of the flexible wiring portion can be reduced in width, and thus a reaction force can be reduced sufficiently. Further, the flexure-integrated wiring body has a shielding effect, and thus the transmission of electrical signals can be stabilized.

Figure 17:
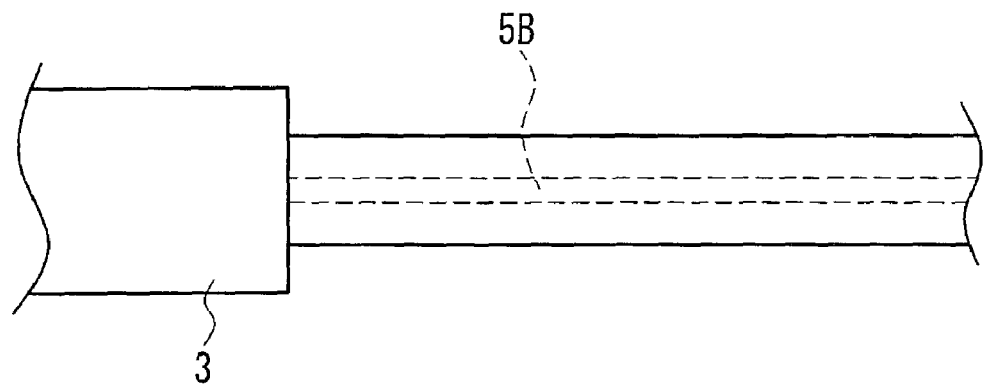
FIG. 17 is a schematic plan view showing still another configuration of the flexible wiring portion of the wiring body shown in FIG. 2.

FIG. 17 is a schematic plan view showing still another configuration of the flexible wiring portion of the wiring body 100 shown in FIG. 2. One metal sheet 5B may be formed along a longitudinal direction of the driving wirings 2 in substantially a center of the flexible wiring portion.

Figure 18:
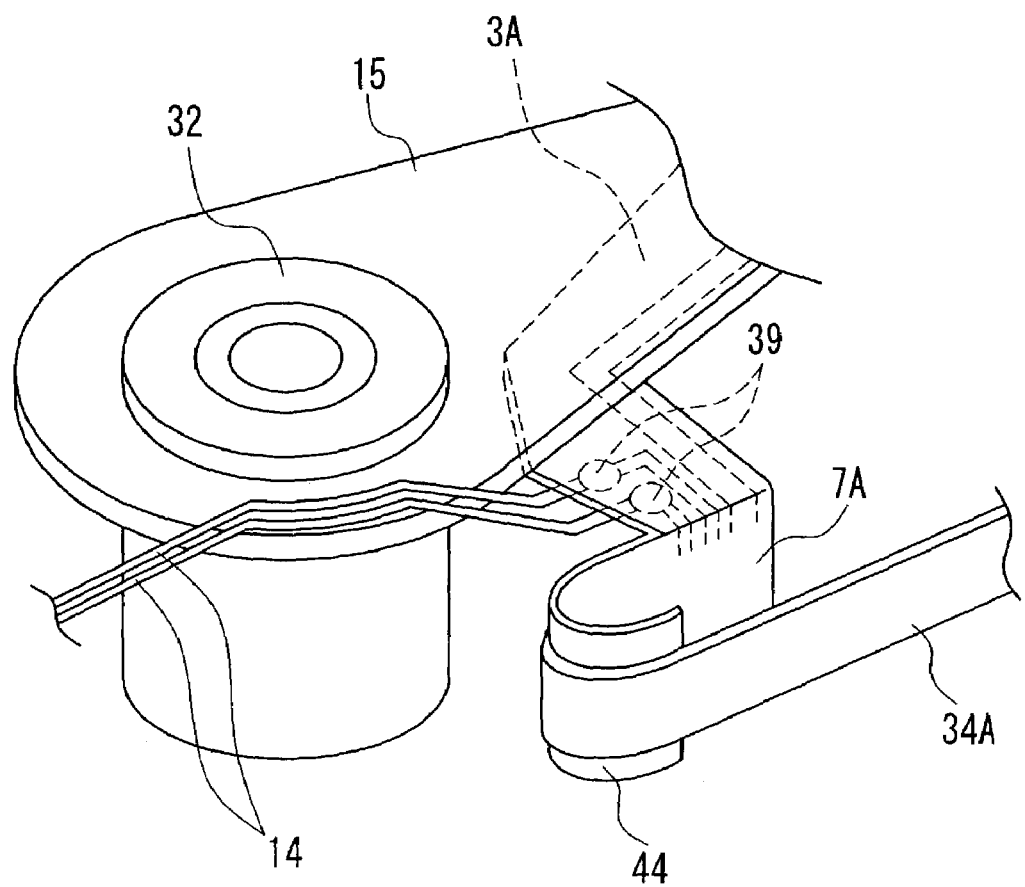
FIG. 18 is a perspective view for explaining another configuration of the wiring connecting portion of the flexure sheet provided in the wiring body according to Embodiment 1.

FIG. 18 is a perspective view for explaining another configuration of the wiring connecting portion of the flexure sheet provided in the wiring body according to Embodiment 1. In the figure, like reference characters refer to the corresponding components described above with reference to FIG. 5, for which detailed descriptions are omitted.

In the wiring connecting portion of a flexure sheet 3A, a bent portion 7A is formed by being bent along a direction substantially perpendicular to a surface of a disk 20. In the bent portion 7A, a curved portion 44 curved by making a 180 degree turn so as to have a J shape is formed. A flexible wiring portion 34A is curved along the curved portion 44 and extends toward a lead-out terminal portion 13 that is not shown.

When the curved portion 44 is formed in the bent portion 7A of the flexure sheet 3A as described above, an efficiency in obtaining one flexure sheet developed on a flat surface from a material can be improved, thereby allowing the cost reduction of the flexure sheet to be achieved.

The foregoing description was directed to an example in which the curved portion 44 was formed in the bent portion 7A of the flexure sheet 3A. However, the present invention is not limited thereto and may have a configuration in which only the flexible wiring portion 34A is curved.

Furthermore, in the example described above, the curved portion 44 was curved by making a 180 degree turn so as to have a J shape. However, it is not necessarily required that the curved portion 44 have an angle of 180 degrees. The angle of the curved portion 44 only is required to be appropriate for the flexible wiring portion 34A to extend toward the lead-out terminal portion 13.

Moreover, in this embodiment, the description was directed to an example in which the feeding wirings 14 were soldered at the feeding connection terminals 39 provided in the flexure sheet 3 so as to be connected to the driving wirings 2 provided in the wiring body 100. However, the flexure sheet 3 may be configured so that the feeding wirings 14 also are provided on the flexure sheet 3. When the flexure sheet 3 is configured so that the feeding wirings 14 also are provided on the flexure sheet 3, the feeding wirings 14 and the driving wirings 2 can be integrated, thereby eliminating the need for soldering at the feeding connection terminals 39.

(Embodiment 2)

Figure 19:
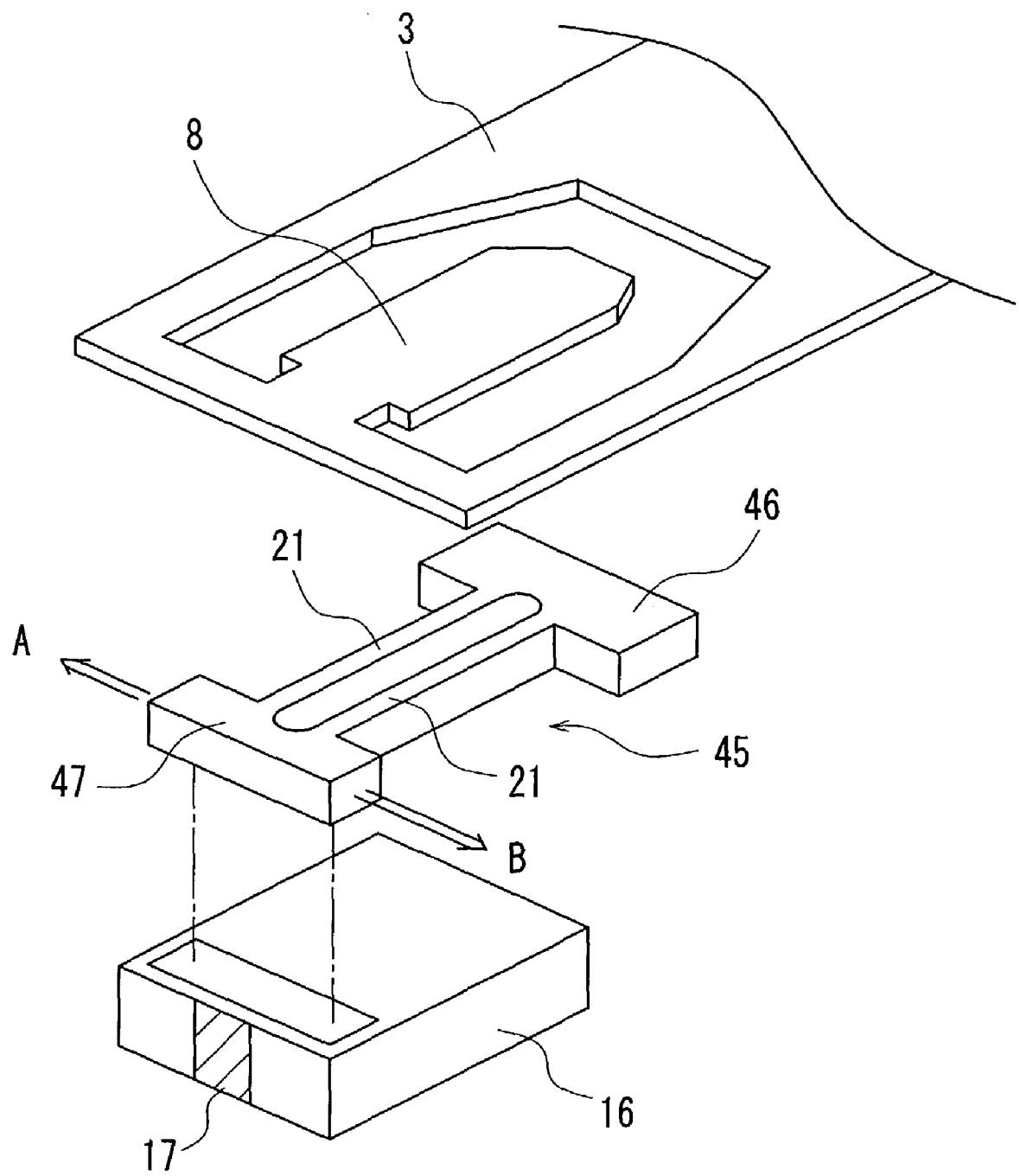
FIG. 19 is a perspective view for explaining a configuration of a piezoelectric actuator provided in a wiring body according to Embodiment 2.
Figure 20:
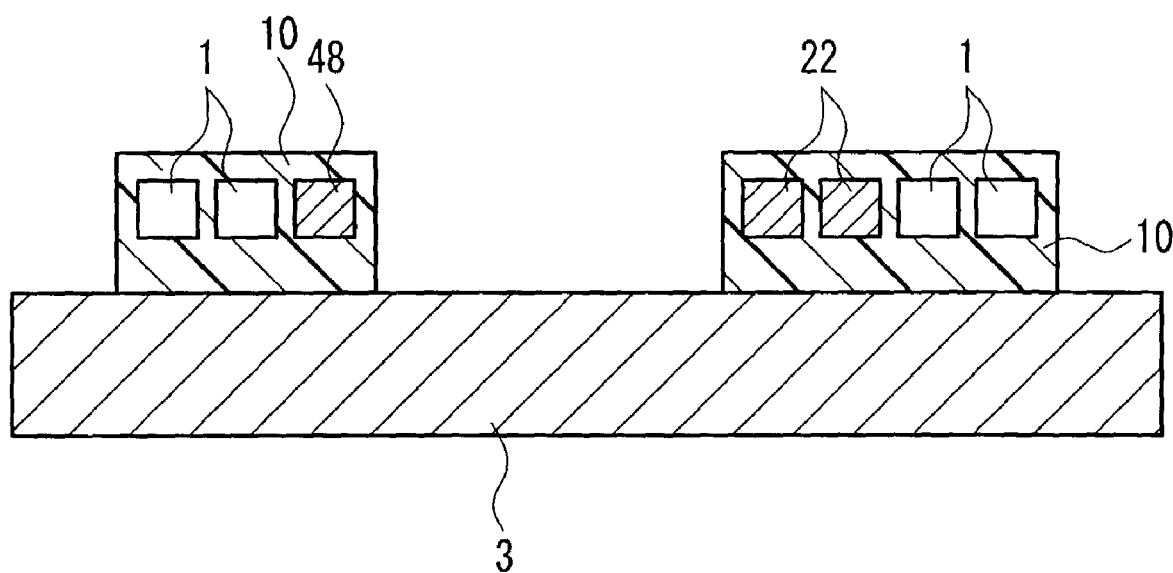
FIG. 20 is a cross sectional view for explaining a configuration of wirings for supplying signals to the piezoelectric actuator provided in the wiring body according to Embodiment 2.

FIG. 19 is a perspective view for explaining a configuration of a piezoelectric actuator provided in a wiring body according to Embodiment 2. FIG. 20 is a cross sectional view for explaining a configuration of wirings for supplying signals to the piezoelectric actuator provided in the wiring body according to Embodiment 2. In the figures, like reference characters refer to the corresponding components described regarding Embodiment 1 with reference to FIGS. 4 and 6, for which detailed descriptions are omitted.

A flexure sheet 3 according to Embodiment 2 includes a piezoelectric actuator 45. The piezoelectric actuator 45 is provided so that a head 17 mounted on a head slider 16 is displaced finely. The piezoelectric actuator 45 includes a pair of piezoelectric actuators 21 provided along a longitudinal direction of the flexure sheet 3.

At one end of each of the piezoelectric actuators 21, one end portion 46 having substantially a shape of a rectangular solid is formed so as to be supported and fixed by a gimbal spring portion 8. At the other end of each of the piezoelectric actuators 21, the other end portion 47 having substantially a shape of a rectangular solid is formed so as to be movable along directions indicated by arrows A and B. The head slider 16 mounting the head 17 is fixed to the other end portion 47.

On an upper face and lower face of each of the piezoelectric actuators 21, electrodes for extending and contracting the piezoelectric actuators 21, which are not shown, are provided respectively.

Actuator signal wirings 22 and an actuator common wiring 48 are formed on the flexure sheet 3. The actuator signal wirings 22 and the actuator common wiring 48 are provided so as to connect the piezoelectric actuators 21 to a lead-out terminal portion by passing over the flexure sheet 3. Thus, each of the piezoelectric actuators 21 can be supplied with a piezoelectric actuator current used to drive the piezoelectric actuators 21 so that the head 17 is displaced finely along the directions indicated by the arrows A and B.

Two actuator signal wirings 22 and two of head wirings 1 are coated respectively with an insulating member 10 formed on the flexure sheet 3. The actuator common wiring 48 and the other two head wirings 1 are coated respectively with another insulating member 10 formed on the flexure sheet 3. The actuator signal wirings 22 and the actuator common wiring 48 are formed so as to be continuous to the lead-out terminal portion along the head wirings 1.

In a disk apparatus according to Embodiment 2 with the above-described configuration, initially, when a disk is driven to rotate by a disk spindle motor, a driving current used to allow an arm to swing is supplied from the lead-out terminal portion to a voice coil motor through driving wirings provided in the wiring body and feeding wirings.

Then, based on the supplied driving current, the voice coil motor allows an arm 15 to swing so that the head 17 mounted on the head slider 16 is set to be in a predetermined position on a disk 20. Next, in each of the head wirings 1 and the driving wirings in a flexible wiring portion of the wiring body, an elastic deflection or deformation is caused according to a swinging motion of the arm.

After that, the piezoelectric actuator current, which is used to drive the piezoelectric actuators 21 so that the head 17 is displaced finely along the directions indicated by the arrows A and B, is supplied to each of the piezoelectric actuators 21 through the actuator signal wirings 22 and the actuator common wiring 48. Then, one of the piezoelectric actuators 21 extends along the longitudinal direction and the other piezoelectric actuator 21 contracts along the longitudinal direction, so that the head 17 is displaced finely toward the direction indicated by the arrow A or the direction indicated by the arrow B. For example, in FIG. 19, when the piezoelectric actuator 21 on a near side extends and the piezoelectric actuator 21 on a far side contracts, the head 17 is displaced finely toward the direction indicated by the arrow A. Conversely, when the piezoelectric actuator 21 on the far side extends and the piezoelectric actuator 21 on the near side contracts, the head 17 is displaced finely toward the direction indicated by the arrow B. In this manner, the head 17 mounted on the head slider 16 is set accurately in a predetermined position on the disk 20.

As described above, according to Embodiment 2, the piezoelectric actuators are provided, and thus even with an increased number of wirings, in a wiring connecting portion, it is only required that the feeding wirings from the voice coil motor be connected to the driving wirings. Thus, the workability and reliability of a wiring operation can be prevented from being deteriorated. Furthermore, the flexure sheet in which the wirings are integrated allows high-density wiring, and thus even with an increased number of wirings, a flexible wring portion having a reduced reaction force generated by a swinging motion of an arm can be realized.

Furthermore, even when piezoelectric actuators are provided, and thus the number of wirings is increased, high-density wiring can be achieved. A wiring body can be provided at a reduced cost that is suitable particularly for the use in a compact disk apparatus including one head.

That is, the present invention can provide a greater effect particularly when an increased number of wirings are used as in Embodiment 2. Needless to say, the material of the piezoelectric actuators used in the present invention can be in either form of a bulk or a thin film, and the same effect can be obtained in either case.

As described in the foregoing discussion, the present invention can provide a disk apparatus that can enhance the reliability of a head wiring for supplying a magnetic head with a head current and a driving wiring for supplying a driving current used to drive a voice coil motor, a wiring body for the disk apparatus and a method of manufacturing the wiring body for the disk apparatus.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A disk apparatus, comprising:
   a head slider mounting a head that performs signal recording and/or reproduction with respect to a disk-shaped recording medium;

an arm provided swingably for setting the head mounted on the head slider to be in a desired position on the disk-shaped recording medium;

a driving unit provided for allowing the arm to swing;

a wiring body provided for supplying the head mounted on the head slider with a bead current used for the signal recording or reproduction with respect to the disk-shaped recording medium and supplying the driving unit with a driving current used to allow the arm to swing; and a lead-out terminal portion provided for supplying the wiring body with the head current and the driving current, wherein the wiring body comprises:

a flexure sheet provided in the arm so as to support the head slider;

a head wiring formed so as to connect the head slider to the lead-out terminal portion by passing over the flexure sheet thereby to supply the head mounted on the head slider with the head current; and a driving wiring formed along the head wiring in an area ranging from a wiring connecting portion formed in the flexure sheet to the lead-out terminal portion thereby to supply the driving unit with the driving current, and wherein the flexure sheet is formed of a first metal sheet, and a second metal sheet is formed selectively along the head wiring and the driving wiring in the area ranging from the wiring connecting portion to the lead-out terminal portion.

2. The disk apparatus according to claim 1, wherein the first metal sheet and the second metal sheet are made of the same material and have the same thickness.

3. The disk apparatus according to claim 1, further comprising:

a piezoelectric actuator provided in the flexure sheet so as to allow the head mounted on the head slider to be displaced finely; and an actuator wiring provided so as to connect the piezoelectric actuator to the lead-out terminal portion by passing over the flexure sheet thereby to supply the piezoelectric actuator with a piezoelectric actuator current used to drive the piezoelectric actuator so that the head is displaced finely.

4. The disk apparatus according to claim 1, wherein the flexure sheet is formed of a metal sheet having a bent portion that is bent in the wiring connecting portion.

5. The disk apparatus according to claim 4, wherein the bent portion is bent along a direction substantially perpendicular to a surface of the disk-shaped medium.

6. The disk apparatus according to claim 1, further comprising a feeding wiring connected to the driving wiring in the wiring connecting portion so as to supply the driving unit with the driving current.

7. The disk apparatus according to claim 1, wherein the driving unit is a voice coil motor.

8. The disk apparatus according to claim 1, further comprising a case provided for supporting the arm, the driving unit and the lead-out terminal portion.

9. The disk apparatus according to claim 1, wherein a gimbal spring portion for supporting the head slider is formed in the flexure sheet.

10. The disk apparatus according to claim 1, wherein one head is mounted on the head slider.

11. The disk apparatus according to claim 1, wherein each of the driving wiring and a part of the head wiring formed along the driving wiring is configured so that elastic deflection or deformation is caused according to a swinging motion of the arm.

12. The disk apparatus according to claim 1, wherein each of the driving wiring and a part of the head wiring formed along the driving wiring is formed into an arch in the area between the lead-out terminal portion and the wiring connecting portion formed in the flexure sheet.

13. A wiring body for a disk apparatus provided for supplying a head mounted on a head slider so as to perform signal recording and/or reproduction with respect to a disk-shaped recording medium with a head current used for the signal recording or reproduction with respect to the disk-shaped recording medium, and supplying a driving unit provided for allowing an arm to swing with a driving current used to allow the arm to swing, the arm being provided swingably so as to set the head mourned on the head slider to be in a desired position on the disk-shaped recording medium, wherein the wiring body is supplied with the head current and the driving current from a lead-out terminal portion;

the wiring body comprising:

a flexure sheet formed in the arm so as to support the head slider;

a head wiring formed so as to connect the head slider to the lead-out terminal portion by passing over the flexure sheet thereby to supply the head mounted on the head slider with the head current; and a diving wiring formed along the head wiring in an area ranging from the lead-out terminal portion to a wiring connecting portion formed in the flexure sheet thereby to supply the driving unit with the driving current, wherein the wiring body further comprises a connecting terminal portion provided so that the head wiring and the driving wiring are connected to the lead-out terminal portion, and wherein the flexure sheet is formed of a first metal sheet, and a second metal sheet is formed selectively along the head wiring and the driving wiring in an area ranging from the connecting terminal portion to the wiring connecting portion.

14. The wiring body according to claim 13, wherein the first metal sheet and the second metal sheet are made of the same material and have the same thickness.

15. The wiring body according to claim 13, wherein a plurality of the second metal sheets are formed selectively at a predetermined distance from each other along a direction substantially perpendicular to a longitudinal direction of the driving wiring.

16. The wiring body according to claim 13, wherein a plurality of the second metal sheets are formed selectively at a predetermined distance from each other along a longitudinal direction of the driving wiring.

17. The wiring body according to claim 13, wherein the second metal sheet is formed selectively along a longitudinal direction of the driving wiring.

18. The wiring body according to claim 13, wherein each of the head wiring and the driving wiring is coated with an insulating member formed on the flexure sheet.

* * * * *